US012623689B2

(12) United States Patent　　　　　　(10) Patent No.:　　US 12,623,689 B2
Kim et al.　　　　　　　　　　　　　　(45) Date of Patent:　　　May 12, 2026

(54) AUTONOMOUS DRIVING CONTROL APPARATUS AND AUTONOMOUS DRIVING CONTROL METHOD

(71) Applicants:Hyundai Motor Company, Seoul (KR); Kia Corporation, Seoul (KR)

(72) Inventors: Jin Kwon Kim, Suwon-Si (KR); Jeong Woo Kim, Seoul (KR); Dong Eon Oh, Seoul (KR); Seung Geon Moon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 166 days.

(21) Appl. No.: 18/377,364

(22) Filed: Oct. 6, 2023

(65) Prior Publication Data

US 2024/0199075 A1　　　Jun. 20, 2024

(30) Foreign Application Priority Data

Dec. 15, 2022　(KR) ........................ 10-2022-0176134

(51) Int. Cl.
　B60W 60/00　　　(2020.01)
　B60W 30/09　　　(2012.01)
　　　　　(Continued)

(52) U.S. Cl.
　CPC ........　B60W 60/0011 (2020.02); B60W 30/09 (2013.01); B60W 30/0956 (2013.01); B60W 40/072 (2013.01); B60W 40/107 (2013.01); B60W 50/0097 (2013.01); B60W 60/0015 (2020.02); B60W 60/00274 (2020.02); B60W

*2552/30* (2020.02); *B60W 2554/4045* (2020.02); *B60W 2554/80* (2020.02)

(58) Field of Classification Search
　CPC ............. B60W 60/0011; B60W 30/09; B60W 30/0956; B60W 40/072; B60W 40/107; B60W 50/0097; B60W 60/0015; B60W 60/00274; B60W 2552/30; B60W 2554/4045; B60W 2554/80; B60W 2520/125; B60W 2554/00; B60W 60/0027; B60W 60/001; B60W 30/10; B60W 40/109; B60W 2554/4044
　See application file for complete search history.

(56)　　　　　References Cited

U.S. PATENT DOCUMENTS 10,345,814 B2　7/2019　Keller et al.
2014/0074388 A1*　3/2014　Bretzigheimer ... B62D 15/0275
　　　　　　　　　　　　　　701/117

(Continued)

FOREIGN PATENT DOCUMENTS

KR　　　　102184929 B1　12/2020

*Primary Examiner* — Jason Holloway
(74) *Attorney, Agent, or Firm* — Banner & Witcoff, Ltd.

(57)　　　　　　ABSTRACT

The autonomous driving control apparatus may be configured to generate one or more driving routes while a host vehicle travels in a first driving route, generate, based on a comparison of each of a plurality of final steering avoidance times for the one or more driving routes to a threshold time, a non-collision route range and a collision route range among the one or more driving routes, and control, based on the first driving route being included in the collision route range, the host vehicle to travel in a second driving route included in the non-collision route range.

20 Claims, 10 Drawing Sheets

(51) Int. Cl.
    *B60W 30/095*         (2012.01)
    *B60W 40/072*         (2012.01)
    *B60W 40/107*         (2012.01)
    *B60W 50/00*          (2006.01)

(56)          References Cited

U.S. PATENT DOCUMENTS

| | | | |
|---|---|---|---|
| 2014/0316668 A1* | 10/2014 | Akiyama | B60W 10/20 |
| | | | 701/70 |
| 2017/0102707 A1* | 4/2017 | Reichel | G05D 1/0219 |
| 2019/0047555 A1* | 2/2019 | Düring | B60W 30/09 |
| 2019/0100197 A1* | 4/2019 | Saiki | B60Q 9/008 |
| 2020/0258380 A1* | 8/2020 | Wissing | G08G 1/04 |

* cited by examiner

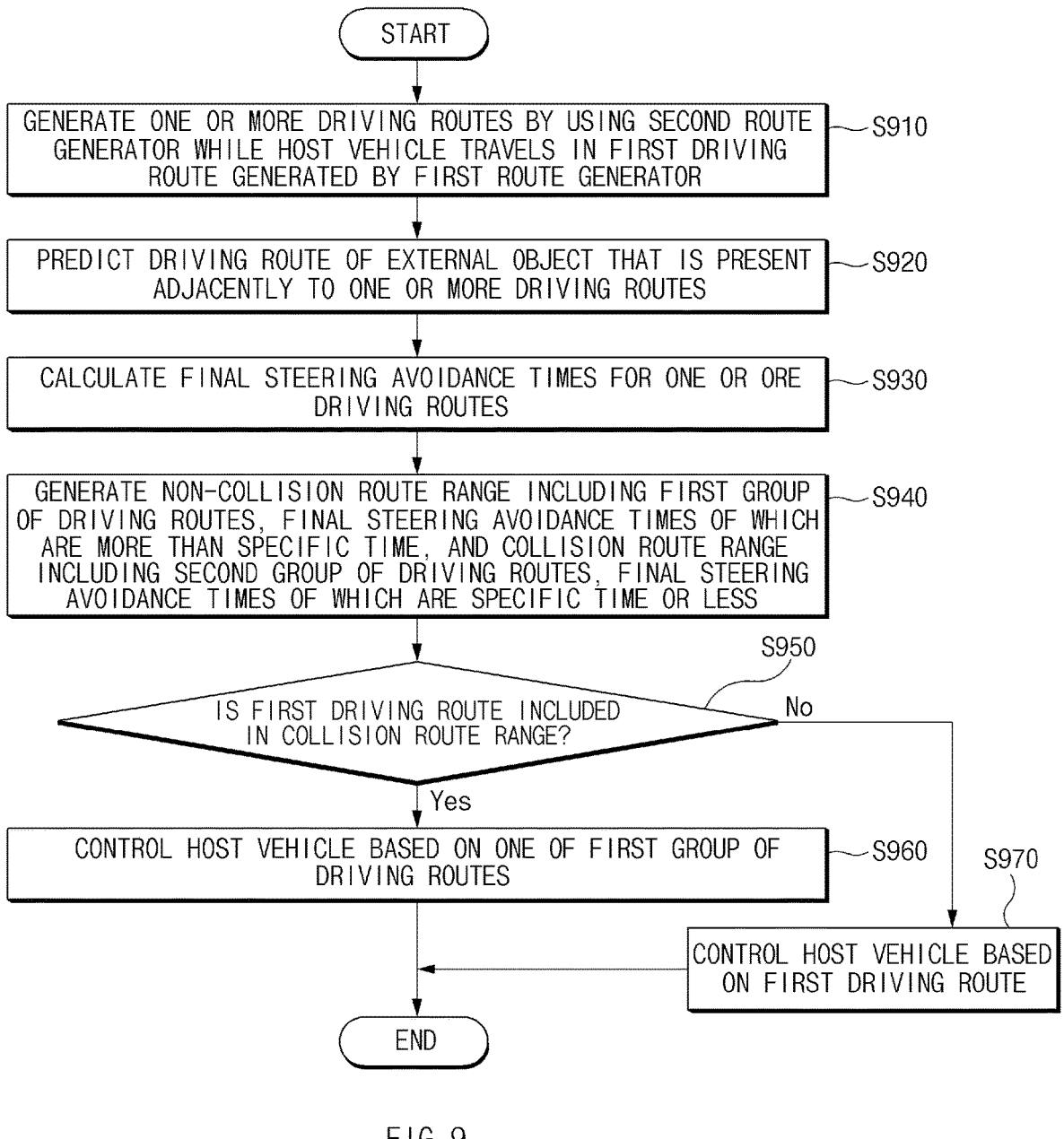

START

GENERATE ONE OR MORE DRIVING ROUTES BY USING SECOND ROUTE GENERATOR WHILE HOST VEHICLE TRAVELS IN FIRST DRIVING ROUTE GENERATED BY FIRST ROUTE GENERATOR ~S910

PREDICT DRIVING ROUTE OF EXTERNAL OBJECT THAT IS PRESENT ADJACENTLY TO ONE OR MORE DRIVING ROUTES ~S920

CALCULATE FINAL STEERING AVOIDANCE TIMES FOR ONE OR ORE DRIVING ROUTES ~S930

GENERATE NON-COLLISION ROUTE RANGE INCLUDING FIRST GROUP OF DRIVING ROUTES, FINAL STEERING AVOIDANCE TIMES OF WHICH ARE MORE THAN SPECIFIC TIME, AND COLLISION ROUTE RANGE INCLUDING SECOND GROUP OF DRIVING ROUTES, FINAL STEERING AVOIDANCE TIMES OF WHICH ARE SPECIFIC TIME OR LESS ~S940

S950

IS FIRST DRIVING ROUTE INCLUDED IN COLLISION ROUTE RANGE?          No

Yes

CONTROL HOST VEHICLE BASED ON ONE OF FIRST GROUP OF DRIVING ROUTES ~S960          S970

CONTROL HOST VEHICLE BASED ON FIRST DRIVING ROUTE

END

FIG.9

AUTONOMOUS DRIVING CONTROL APPARATUS AND AUTONOMOUS DRIVING CONTROL METHOD

CROSS-REFERENCE TO RELATED APPLICATION

This application claims the benefit of priority to Korean Patent Application No. 10-2022-0176134, filed in the Korean Intellectual Property Office on Dec. 15, 2022, the entire contents of which are incorporated herein by reference.

TECHNICAL FIELD

The present disclosure relates to an autonomous driving control apparatus and an autonomous driving control method, and more particularly, to a technology of determining a new driving route.

BACKGROUND

As autonomous driving vehicles have gradually been adopted, various technologies regarding autonomous driving have been developed. For example, for stable driving of an autonomous driving vehicle, technologies related to measuring a driving environment, controlling driving of a vehicle according to a measured driving environment, and preventing collision with an autonomous driving vehicle are becoming important.

The autonomous driving vehicle may go to a destination by itself while maintaining a distance from an obstacle that is present on a driving route and adjusting a speed and a travel direction thereof according to a shape of a road even though a driver does not manipulate an accelerator pedal or a brake. For example, a vehicle may be accelerated on a straight road and may be decelerated while a travel direction thereof is changed in correspondence to a curvature of the road in a curved road.

In particular, to safely control autonomous driving of the host vehicle, technologies regarding methods of generating a driving route have been developed.

An autonomous driving control apparatus according to a conventional technology controls both driving and avoidance of a collision by generating one driving route to control driving of the host vehicle. However, when a user gets involved in control of a host vehicle or a plurality of devices (e.g., driving route generators) that generate a driving route are mounted, accuracy and promptness of control of autonomous driving may deteriorate.

SUMMARY

The present disclosure has been made to solve the above-mentioned problems occurring in the prior art while advantages achieved by the prior art are maintained intact.

An aspect of the present disclosure provides an autonomous driving control apparatus that, while a host vehicle is controlled in a driving route generated by a specific driving route generator, by an autonomous driving control apparatus including a plurality of devices (e.g., driving route generators) that generate and/or correct the driving route for driving of the host vehicle, determines whether a driving route is suitable by using another driving route generator, to determine whether the driving route is to be changed, and an autonomous driving control method.

Another aspect of the present disclosure provides an autonomous driving control apparatus, that sets a range for a time and/or a radius for searching for a route, predicts routes of surround objects within the set range, determines whether a danger of collision of a host vehicle and the surrounding objects is present based on a prediction result, and generates an avoidance route based on the determination result to change the driving route, and an autonomous driving control method.

Another aspect of the present disclosure provides an autonomous driving control apparatus that uses a transverse collision avoidance algorithm to avoid a collision between a host vehicle and an external object, and an autonomous driving control method.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an autonomous driving control apparatus may include: a memory configured to store one or more instructions; and a controller coupled to the memory. The autonomous driving control apparatus may be configured to, when the one or more instructions are executed by the controller: generate one or more driving routes while a host vehicle travels in a first driving route; generate, based on a comparison of each of a plurality of final steering avoidance times for the one or more driving routes to a threshold time, a non-collision route range and a collision route range among the one or more driving routes; and control, based on the first driving route being included in the collision route range, the host vehicle to travel in a second driving route included in the non-collision route range.

The autonomous driving control apparatus may be configured to, when the one or more instructions are executed by the controller: control, based on the first driving route being included in the non-collision route range, the host vehicle to maintain course in the first driving route.

The autonomous driving control apparatus may be configured to, when the one or more instructions are executed by the controller: generate the one or more driving routes by generating the one or more driving routes during a specific maximum search time period based on a specific time cycle.

The one or more driving routes may be within a specific curvature radius range associated with the host vehicle.

The autonomous driving control apparatus may be configured to, when the one or more instructions are executed by the controller: predict a travel route of an external object. The external object does not move away from the host vehicle. The external object may not move behind the host vehicle.

The autonomous driving control apparatus may be configured to, when the one or more instructions are executed by the controller: determine a largest value of the plurality of final steering avoidance times; and store, in the memory, the largest value in correspondence to the one or more driving routes.

The autonomous driving control apparatus may be configured to, when the one or more instructions are executed by the controller, determine a first minimum steering avoidance time, based on at least one of: a transverse avoidance requiring distance calculated by adding a first length from a first point corresponding to an external object to a contact point that contacts a transverse line extending from the first point on the one or more driving routes, and a second length the host regarding vehicle, an available transverse acceleration obtained by subtracting a transverse acceleration value required for the host vehicle to travel along the one or more driving routes from the first driving route from an allowable transverse acceleration limit value of the host vehicle, or a required travel time that is necessary for the host vehicle to travel from a current point to the first point. The autonomous driving control apparatus may be configured to determine the plurality of final steering avoidance times for the one or more driving routes by subtracting the first minimum steering avoidance time from a predicted collision time with the external object.

The autonomous driving control apparatus may be configured to determine the plurality of final steering avoidance times by: determining a second minimum steering avoidance time based on a second point corresponding to the external object; and subtracting a larger value of the first minimum steering avoidance time and the second minimum steering avoidance time from the predicted collision time with the external object. The second point may be a point included in one of a left area or a right area with respect to a direction which the host vehicle faces.

The autonomous driving control apparatus may be configured to determine the plurality of final steering avoidance times by: determining a third minimum steering avoidance time based on a third point corresponding to the external object; and subtracting a smaller value of the first minimum steering avoidance time and the third minimum steering avoidance time from the predicted collision time with the external object. The first point and the third point may be included in different areas of the left area and the right area.

The autonomous driving control apparatus may be configured to, when the one or more instructions are executed by the controller: control, based on the first driving route being included in the collision route range, the host vehicle to travel in a border route that is closest, of the non-collision route range, to the first driving route.

According to one or more example embodiments of the present disclosure, a method may include: generating, by one or more processors, one or more driving routes while a host vehicle travels in a first driving route; generating, based on a comparison of each of a plurality of final steering avoidance times for the one or more driving routes to a threshold time, a non-collision route range and a collision route range among the one or more driving routes; and control, based on the first driving route being included in the collision route range, the host vehicle to travel in a second driving route included in the non-collision route range.

The method may further include: generating one or more additional driving routes while the host vehicle travels in a third driving route; and controlling, based on the third driving route being included in a second non-collision route range, the host vehicle to maintain course in the third driving route.

Generating of the one or more driving routes may include: generating the one or more driving routes during a specific maximum search time period based on a specific time cycle.

The one or more driving routes may be in a specific curvature radius range associated with the host vehicle.

The method may further include: predicting a travel route of an external object. The external object may not move away from the host vehicle. The external object may not move behind the host vehicle.

The method may further include: determining a largest value of the plurality of final steering avoidance times; and storing the largest value in correspondence to the one or more driving routes.

The method may further include: determining a first minimum steering avoidance time, based on at least one of: a transverse avoidance requiring distance calculated by adding a first length from a first point corresponding to an external object to a contact point that contacts a transverse line extending from the first point on the one or more driving routes, and a second length regarding the host vehicle, an available transverse acceleration obtained by subtracting a transverse acceleration value required for the host vehicle to travel along the one or more driving routes from the first driving route from an allowable transverse acceleration limit value of the host vehicle, and a required travel time that is necessary for the host vehicle to travel from a current point to the first point; and determining the plurality of final steering avoidance times for the one or more driving routes by subtracting the first minimum steering avoidance time from a predicted collision time with the external object.

Determining the plurality of final steering avoidance times may include: determining a second minimum steering avoidance time based on a second point corresponding to the external object; and subtracting a larger value of the first minimum steering avoidance time and the second minimum steering avoidance time from the predicted collision time with the external object. The first point and the second point may be included in a same area of a left area or a right area with respect to the direction which the host vehicle faces.

Determining the plurality of final steering avoidance times may include: determining a third minimum steering avoidance time based on a third point corresponding to the external object; and subtracting a smaller value of the first minimum steering avoidance time and the third minimum steering avoidance time from predicted collision time with the external object. The first point and the third point may be included in different areas of the left area and the right area with respect to the direction which the host vehicle faces.

The method may further include: controlling, based on the first driving route being included in the collision route range, the host vehicle to travel in a border route that is closest, of the non-collision route range, to the first driving route.

BRIEF DESCRIPTION OF THE DRAWINGS

The above and other objects, features and advantages of the present disclosure will be more apparent from the following detailed description taken in conjunction with the accompanying drawings:

FIG. 9 is a flowchart of operations of an autonomous driving control apparatus.

With regard to description of drawings, the same or similar components may be marked by the same or similar reference numerals.

DETAILED DESCRIPTION

Figure 1:
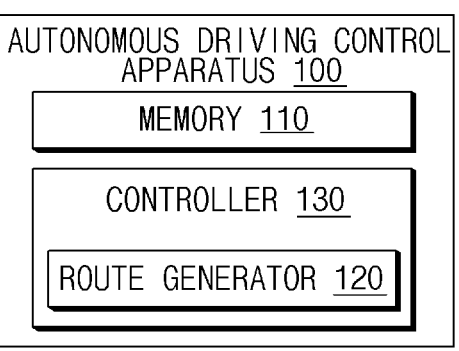
FIG. 1 is a block diagram illustrating components of an autonomous driving control apparatus.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

The terms, such as first, second, A, B, (a), (b) or the like may be used herein when describing components of the present disclosure. The terms are provided only to distinguish the components from other components, and the essences, sequences, orders, and the like of the components are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, one or more example embodiments of the present disclosure will be described in detail with reference to FIGS. 1 to 10.

FIG. 1 is a block diagram illustrating components of an autonomous driving control apparatus.

An autonomous driving control apparatus 100 may include at least one of a memory 110, route generator 120, a controller 130, or any combination thereof. A configuration of the autonomous driving control apparatus 100 illustrated in FIG. 1 is exemplary, and the embodiments of the present disclosure are not limited thereto. For example, the autonomous driving control apparatus 100 may further include components (e.g., at least one of an interface part, a communication part, a sensor part, or any combination thereof) that are not illustrated in FIG. 1. For example, the route generator 120 may include a plurality of route generators. The route generator 120 may be implemented with hardware (e.g., one or more processors, memory), software, or a combination of both. For example, the route generator 120 may be implemented with software and be executed using the controller 103 and/or the memory 110.

The memory 110 may store instructions or data. For example, the memory 120 may store one or more instructions that, when being executed by the controller 110, cause the autonomous driving control apparatus 100 to perform various operations.

For example, the memory 110 may be implemented by the controller 130 and one chipset. The controller 130 may include at least one of a communication processor or a modem.

For example, the memory 110 may store various information elements associated with the autonomous driving control apparatus 100. As an example, the memory 110 may store information on an operation history of the controller 130. As an example, the memory 110 may store information associated with a state and/or an operation of the components (e.g., at least one of an engine control unit (ECU), the route generator 120, the controller 130, or any combination thereof) of a host vehicle. The memory 110 may store largest values of a plurality of final steering avoidance times calculated for one or more driving routes, respectively, in correspondence to the one or more driving routes.

The route generator 120 may include a plurality of route generators. For example, the route generator 120 may generate a driving route for driving of the host vehicle. For example, the route generator 120 may generate the one or more driving routes based on at least some of driving environments (e.g., at least one of an external object, a driving speed, a driving road environment, a weather, a performance of the host vehicle, or any combination thereof) of the host vehicle.

For example, the route generator 120 may generate a first driving route by using the first route generator. The controller 130 may control driving of the host vehicle according to the first driving route generated by the first route generator.

For example, the route generator 120 may generate the one or more driving routes by using the second route generator while the host vehicle travels in the first driving route generated by the first route generator. For example, the first driving route, in which the host vehicle travels, may be a driving route generated by the route generator 120, and may be a driving route determined based on an intention of a user (or a driver).

For example, the route generator 120 may generate at least one driving routes for a specific maximum search time period (e.g., 2.5 seconds) based on a specific time cycle (e.g., 0.1 seconds). Values of the time cycle and the maximum search time period are exemplary, and the one or more example embodiments of the present disclosure are not limited thereto.

For example, the route generator 120 may generate one or more driving routes in a specific curvature radius range with respect to the host vehicle. As an example, the route generator 120 may generate one or more driving routes included in a specific curvature radius (e.g., −20 m to 20 m) with respect to a current location of the host vehicle. For example, the route generator 120 may generate one or more driving routes by changing a coefficient of a quadratic term in an equation including a third-order polynomial for generating a driving route.

The controller 110 may be electrically connected to the memory 120 and/or the route generator 120. The controller 110 may control operations of the memory 120 and/or the route generator 120.

For example, the controller 130 may generate the one or more driving routes by using the second route generator while driving of the host vehicle is controlled to the first driving route generated by the first route generator.

For example, the controller 130 may predict travel routes of one or more external objects that are present outside the host vehicle. As an example, the controller 130 may predict travel routes of external objects that are present adjacently to the one or more driving routes.

As an example, the external objects may include objects (e.g., at least one of a vehicle, a person, a building, a structure, or any combination thereof) when the host vehicle continuously travels in the first driving route.

As an example, the controller 130 may predict a driving route of a specific one of the plurality of external objects.

The controller 130, for example, may predict a travel route of an external object, except for at least one of an object that travels in a direction that becomes farther away from the host vehicle, an object that travels on a rear side of the host vehicle, or any combination thereof.

For example, the controller 130 may calculate final steering avoidance times from a current time point to final time points, at which collision with the external object that moves in the predicted travel route is avoided, for the one or more driving routes, by the controller.

As an example, the final steering avoidance time may be a final time for starting control of driving, by which the external object that is predicted to collide with the host vehicle.

For example, the controller 130 may calculate the minimum steering avoidance time (e.g., a steering avoidance requiring time) based on a transverse avoidance requiring distance, an available transverse acceleration, and/or a required travel time, and may calculate the final steering avoidance time by subtracting the calculated minimum steering avoidance time from a predicted collision time (e.g., a time-to-collision (TTC) time) with the external object.

As an example, the controller 130 may calculate the transverse avoidance requiring distance by adding a first length from a first point corresponding to the external object to a contact point that contacts a transverse line extending from the first point on the first driving route, and a second length regarding the host vehicle.

As an example, the controller 130 may calculate an available transverse acceleration by subtracting a transverse acceleration value required for the host vehicle to travel along the one or more driving routes from the first driving route by changing the driving routes, from an allowable transverse acceleration limit value of the host vehicle.

As an example, the controller 130 may calculate the required travel time by calculating a time that is required for the host vehicle to travel from a current point to the first point.

As an example, the controller 130 may calculate the final steering avoidance time by subtracting the first minimum steering avoidance time from the predicted collision time with the external object.

For example, the controller 130 may calculate the final steering avoidance time by subtracting a largest value of the plurality of minimum steering avoidance times in the same direction from the predicted collision time, to avoid the external object through control of steering in the same direction with respect to a travel direction of the host vehicle.

As an example, the controller 130 may identify a second point on the external object, which is located in, among a left area and a right area with respect to a direction, which the host vehicle faces, the same area as the first point. The controller 130, for example, may calculate a second minimum steering avoidance time based on the second point. The controller 130, for example, may calculate a left final steering avoidance time by subtracting a largest value of the first minimum steering avoidance time and the second minimum steering avoidance time from the predicted collision time with the external object.

As an example, the controller 130 may calculate a right final steering avoidance time based on the same scheme as the calculation scheme of the left final steering avoidance time. The controller 130, for example, may use a third point included in an area that is different from the second point to calculate the right final steering avoidance time. The third point, for example, may be a point included in, among the left area and the right area with respect to the direction, which the host vehicle faces, an area that is different from the second point.

For example, the controller 130 may generate a non-collision route range including, among the one or more driving routes, a first group of driving routes, the final steering avoidance times of which are more than a specific time (e.g., a threshold time).

For example, the controller 130 may generate a collision route range including, among the one or more driving routes, a second group of driving routes, the final steering avoidance times of which are the specific time or less.

For example, the controller 130 may stop control of the host vehicle along the first driving route when the first driving route is included in the collision route range, and may control the host vehicle based on one of the first group of driving routes.

As an example, the controller 130 may control the host vehicle in a border route that is close to the first driving route in the non-collision route range included in the first group of driving routes when the first driving route is included in the collision route range.

Figure 2:
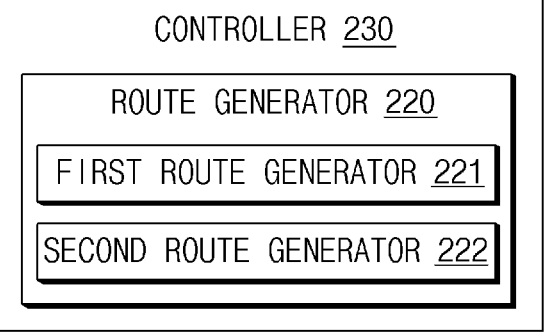
FIG. 2 is a conceptual view of operations of an autonomous driving control apparatus.

FIG. 2 is a conceptual view of operations of the autonomous driving control apparatus.

The autonomous driving control apparatus (e.g., the autonomous driving control apparatus 100 of FIG. 1) may include a route generator 220 (e.g., the route generator 120 of FIG. 1) and a controller 230 (e.g., the controller 130 of FIG. 1). For example, the route generator 220 may include a first route generator 221 and a second route generator 222. The route generator 220 may be electrically connected to the controller 230.

The first route generator 221 may generate the first driving route and deliver it to the controller 230. The controller 230, for example, may control the host vehicle based on the first driving route.—

The second route generator 222 may generate at least one driving route and deliver it to the controller 230. For example, the controller 230 may determine whether the first driving route of the host vehicle is included in the collision route range based on one or more driving routes.

The controller 230 may generate the one or more driving routes by using the second route generator 220 while the host vehicle travels in the first driving route generated by the first route generator 221.

The controller 230 may predict travel routes of external objects that are present adjacently to the one or more driving routes.

The controller 230 final steering may calculate avoidance times from a current time point to final time points, at which collision with the external object that moves in the travel route is avoided, for the one or more driving routes.

The controller 230 may generate a non-collision route range including, among the one or more driving routes, a first group of driving routes, the final steering avoidance times of which are more than a specific time.

The controller 230 may generate a collision route range including, among the one or more driving routes, a first group of driving routes, the final steering avoidance times of which are the specific time or less.

The controller 230 may control the host vehicle based on one of the first group of driving routes when the first driving route is included in the collision route range.

Figure 3:
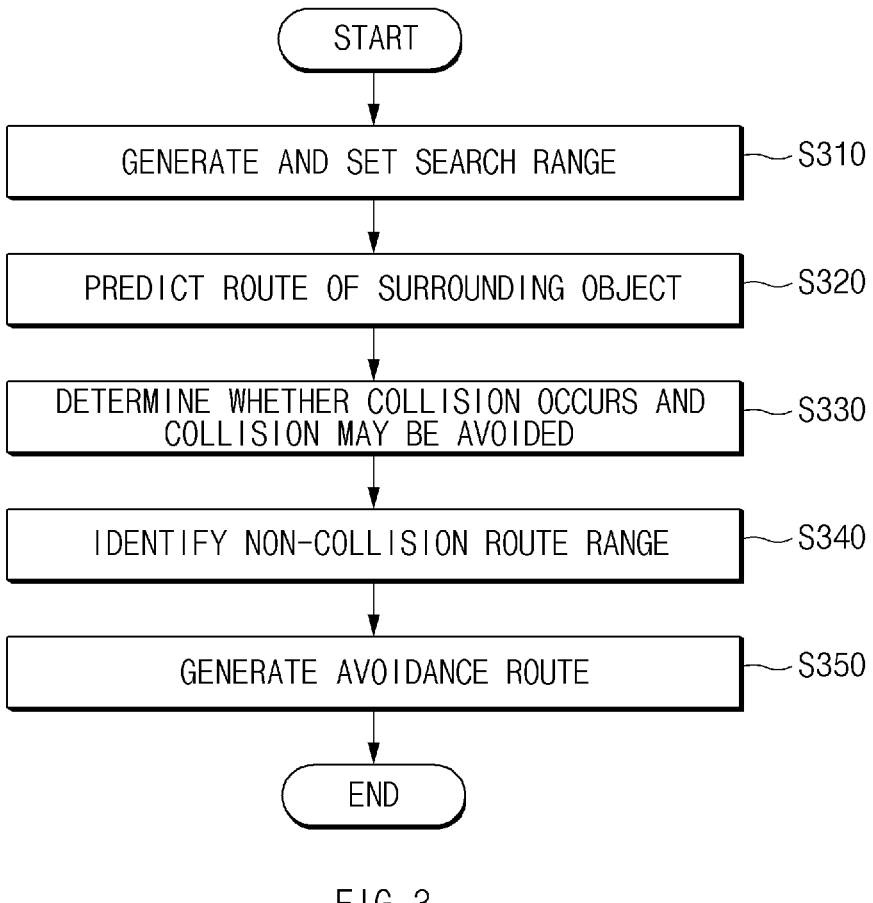
FIG. 3 is a flowchart of operations of an autonomous driving control apparatus.

FIG. 3 is a flowchart of operations of the autonomous driving control apparatus.

The autonomous driving control apparatus (e.g., the autonomous driving control apparatus 100 of FIG. 1) may perform the operations disclosed in FIG. 3. For example, at least some of the components (e.g., the memory 110 and/or the route generator 120 of FIG. 1) included in the autonomous driving control apparatus may be configured to perform the operations of FIG. 3.

Hereinafter, the operations of S310 to S350 may be sequentially performed, but may not be performed necessarily sequentially. For example, the sequence of the operations may be changed, and at least two of the operations may be performed in parallel. Furthermore, the contents that correspond to or the same as the contents described above in relation to FIG. 3 will be described briefly or omitted.

The autonomous driving control apparatus may perform search range generating and/or setting operations (S310).

For example, the autonomous driving control apparatus may generate the one or more driving routes by using the second route generator (e.g., the second route generator 222 of FIG. 2) while the host vehicle is controlled based on the first driving route generated by using the first route generator (e.g., the first route generator 221 of FIG. 2).

For example, the autonomous driving control apparatus may generate and set search ranges of the one or more driving routes generated by using the second route generator. As an example, the search ranges may include time ranges and space ranges.

For example, the autonomous driving control apparatus may set time cycles and maximum search time periods for searching for the one or more driving routes. The autonomous driving control apparatus, for example, may generate one or more driving routes during a specific maximum search time period based on a specific time cycle. As an example, the autonomous driving control apparatus may identify setting values of the time cycle and the search time regarding an operation of the second route generator, and may generate one or more driving routes based on the identified setting values. As an example, the one or more driving routes generated by the second route generator may include a driving route, in which the host vehicle may travel, during a maximum search time period.

For example, the autonomous driving control apparatus may set search space ranges of the one or more driving routes. The autonomous driving control apparatus, for example, may generate one or more driving routes in a specific curvature radius range with respect to the host vehicle.

The autonomous driving control apparatus may perform an operation of predicting a route for a surrounding object (S320).

For example, the autonomous driving control apparatus may predict a travel route of an external object, except for at least one of an object that travels in a direction that becomes farther away from the host vehicle, an object that travels on a rear side of the host vehicle, or any combination thereof.

The autonomous driving control apparatus may perform an operation of determining whether a collision occurs and whether the collision may be avoided (S330).

For example, the autonomous driving control apparatus may use the final steering avoidance time to determine whether a collision occurs and whether the collision may be avoided. The autonomous driving control apparatus, for example, may identify one final steering avoidance time by using at least some of the plurality of final steering avoidance times calculated for the one or more driving routes, and may classify and identify the one or more driving routes based on the identified final avoidance time.

The autonomous driving control apparatus may perform an operation of identifying a non-collision route range (S340).

For example, the autonomous driving control apparatus may generate a non-collision route range including, among the one or more driving routes, a first group of driving routes, the final steering avoidance times of which are more than a specific time.

For example, the autonomous driving control apparatus may generate a collision route range including, among the one or more driving routes, a second group of driving routes, the final steering avoidance times of which are the specific time or less.

The autonomous driving control apparatus may perform an operation of generating an avoidance route (S350).

For example, the autonomous driving control apparatus may control such that the host vehicle avoids the external object through a new driving route, based on whether the first driving route is in the collision route range.

For example, the autonomous driving control apparatus may control the host vehicle based on one of the first group of driving routes when the first driving route is included in the collision route range.

For example, the autonomous driving control apparatus may change the driving route of the host vehicle such that host vehicle travels in a border route that is close to the first driving route in the non-collision route range included in the first group of driving routes when the first driving route is included in the collision route range.

Figure 4:
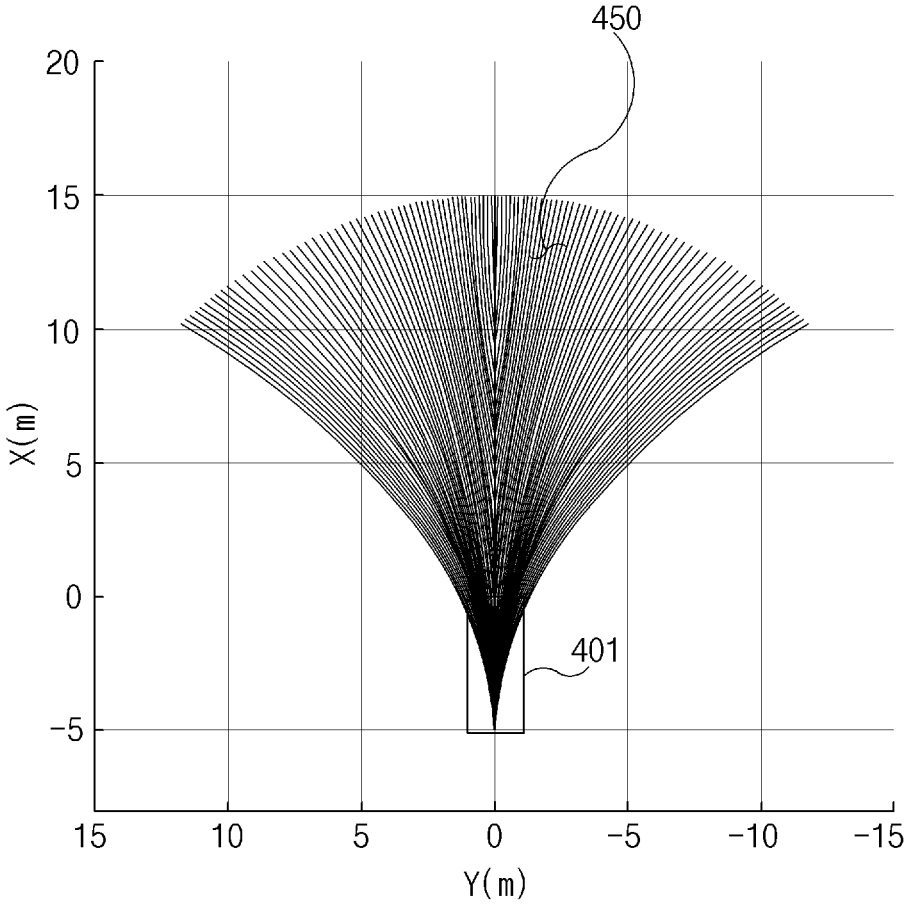
FIG. 4 is a conceptual view illustrating an operation of generating and setting a search range by an autonomous driving control apparatus.

FIG. 4 is a conceptual view illustrating an operation of generating and setting a search range by the autonomous driving control apparatus.

The autonomous driving control apparatus (e.g., the autonomous driving control apparatus 100 of FIG. 1) may set a time range and/or a space range for searching for the one or more routes.

For example, the autonomous driving control apparatus may generate the one or more driving routes by using the second route generator (e.g., the second route generator 222 of FIG. 2) while the host vehicle 401 is controlled based on the first driving route generated by using the first route generator (e.g., the first route generator 221 of FIG. 2).

For example, the autonomous driving control apparatus may generate and set search ranges of the one or more driving routes generated by using the second route generator. As an example, the search ranges may include time ranges and space ranges 450.

For example, the autonomous driving control apparatus may set time cycles and maximum search time periods for searching for the one or more driving routes. The autonomous driving control apparatus, for example, may generate one or more driving routes during a specific maximum search time period based on a specific time cycle.

As an example, the autonomous driving control apparatus may generate at least one driving routes for a specific maximum search time period (e.g., 2.5 seconds) based on a specific time cycle (e.g., 0.1 seconds).

For example, the autonomous driving control apparatus may set search space ranges 450 of the one or more driving routes. The autonomous driving control apparatus, for example, may generate one or more driving routes in a specific curvature radius range with respect to the host vehicle 401.

As an example, the autonomous driving control apparatus may generate one or more driving routes included in a space range 450, a specific curvature radius of which corresponds to a specific range (e.g., −20 m to 20 m) with respect to a current location of the host vehicle 401.

As an example, the autonomous driving control apparatus may generate one or more driving routes by changing a coefficient of a quadratic term in an equation including a third-order polynomial for generating a driving route.

Figure 5:
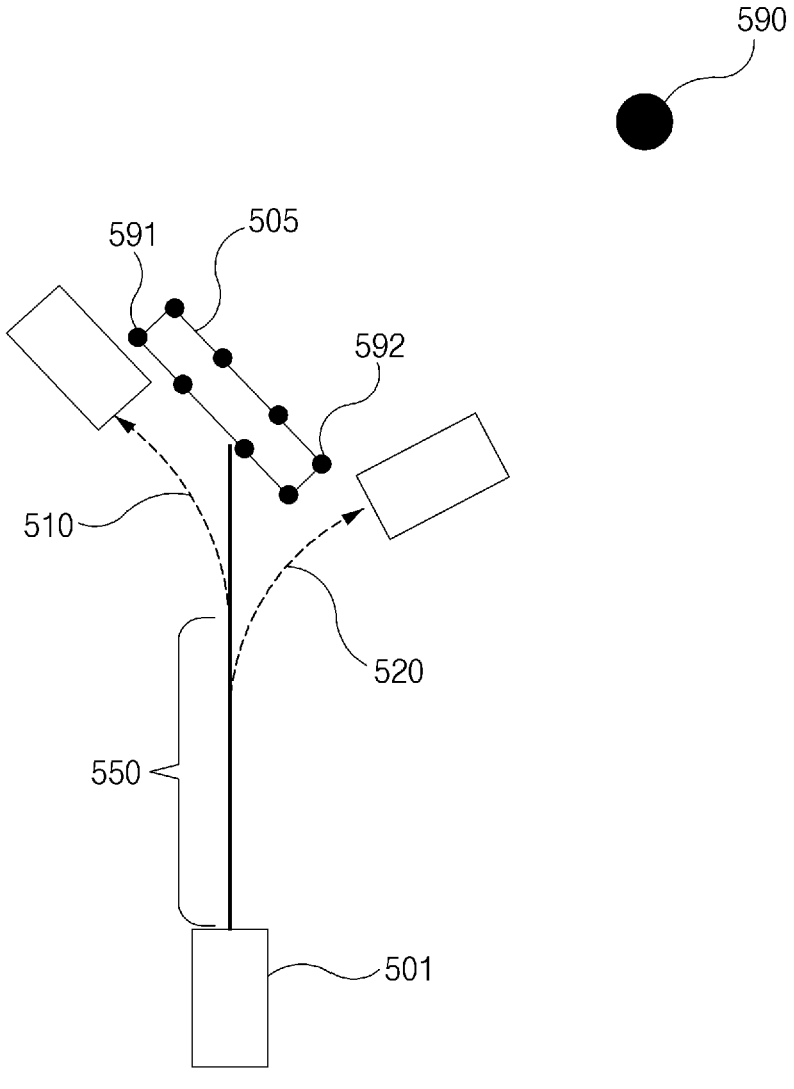
FIG. 5 is a conceptual view illustrating an operation of evaluating whether a collision may be avoided, by an autonomous driving control apparatus.

FIG. 5 is a conceptual view illustrating an operation of evaluating whether a collision may be avoided, by the autonomous driving control apparatus.

The autonomous driving control apparatus (e.g., the autonomous driving control apparatus 100 of FIG. 1) may determine whether a collision of the host vehicle 501 and the external object 505 occurs and/or whether the collision may be avoided.

For example, the autonomous driving control apparatus may determine whether a collision of the host vehicle 501 and the external object 505 occurs and/or the collision may be avoided by using a plurality of points 590 corresponding to the external object 505.

For example, the autonomous driving control apparatus may generate one or more driving routes by using a route generator (e.g., the route generator 120 of FIG. 1). As an example, the host vehicle 501 according to FIG. 5 may be referenced as a case, in which the host vehicle 501 travels based on one of the one or more driving routes generated by the autonomous driving control apparatus.

For example, the autonomous driving control apparatus may determine whether a collision with the external object 505 may be avoided in a leftward direction with respect to a direction, which the host vehicle 501 faces, while the host vehicle 501 travels along the driving route generated through a route generator (or the second route generator 222 of FIG. 2). In other words, the autonomous driving control apparatus may determine whether the host vehicle 501 may avoid a collision with the external object 505 based on a left avoidance route 510 by using a first evaluation point 591. For example, the autonomous driving control apparatus may determine whether a collision with the external object 505 occurs when the host vehicle 501 travels in a second candidate route 520 by using, among the plurality of points corresponding to the external object 505, a second evaluation point 592.

For example, the autonomous driving control apparatus may determine whether the external object 505 may collide when it travels in the driving route by using a left final steering avoidance time 550, at which a collision with the external object 505 may be avoided in a leftward direction at less than a specific transverse acceleration when the host vehicle travels in the driving route.

For example, the autonomous driving control apparatus may determine whether the external object 505 may collide when it travels in the driving route by using a right final steering avoidance time, at which a collision with the external object 505 may be avoided in a rightward direction at less than a specific transverse acceleration when the host vehicle travels in the driving route.

For example, the autonomous driving control apparatus may identify a plurality of final steering avoidance times (e.g., a final steering avoidance time 550 according to the left avoidance route 510 and a final steering avoidance time according to the right avoidance route 520) for the driving routes by using at least some of the plurality of points 590 corresponding to the external object 505.

For example, the autonomous driving control apparatus may identify a minimum value of the plurality of left final steering avoidance times corresponding to the left direction with respect to the direction which the host vehicle faces, as the final steering avoidance time 550 according to the left avoidance route 510. For example, the autonomous driving control apparatus may identify a minimum value of the plurality of right final steering avoidance times corresponding to the right direction with respect to the direction which the host vehicle faces, as the final steering avoidance time 550 according to the right avoidance route 520. For example, the autonomous driving control apparatus may store a largest value of the final steering avoidance time 550 according to the left avoidance route 510 and the final steering avoidance time according to the right avoidance route 520 such that the largest value corresponds to the driving route. The autonomous driving control apparatus may determine whether the driving route is a collision route based on whether the final steering avoidance time stored to correspond to the driving route is a specific time or less.

As an example, the autonomous driving control apparatus may allow the driving route corresponding to the corresponding final steering avoidance time to be included as a driving route of the first group in the non-collision route range when the final steering avoidance time is more than a specific time (e.g., 0.9 seconds). As an example, the autonomous driving control apparatus may allow the driving route corresponding to the corresponding final steering avoidance time to be included as a driving route of the second group in the collision route range when the final steering avoidance time is the specific time (e.g., 0.9 seconds) or less.

Figure 6:
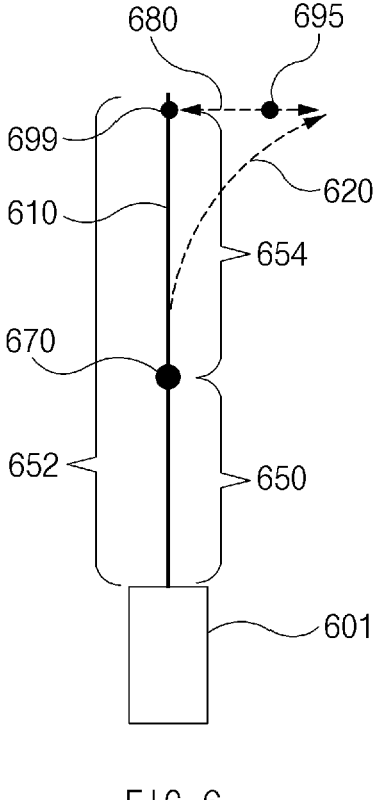
FIG. 6 is a conceptual view illustrating an operation of evaluating whether a collision may be avoided, by an autonomous driving control apparatus.

FIG. 6 is a conceptual view illustrating an operation of evaluating whether a collision may be avoided, by the autonomous driving control apparatus.

The autonomous driving control apparatus (e.g., the autonomous driving control apparatus 100 of FIG. 1) may calculate the final steering avoidance times corresponding to the one or more driving routes, respectively, and may store them in a memory (e.g., the memory 110 of FIG. 1).

FIG. 6 illustrates using a first point 695 to identify a final steering avoidance time point for the driving route 610, but the one or more embodiments of the present disclosure are not limited thereto. For example, the autonomous driving control apparatus may further use at least some of a plurality of points (e.g., the plurality of points 590 of FIG. 9) corresponding to the external object to identify a final steering avoidance time point for the driving route 610.

The driving route 610 may be one of the one or more driving routes generated by a second route generator (e.g., the second route generator 222 of FIG. 2) of a route generator (e.g., the route generator 220 of FIG. 2). For example, the autonomous driving control apparatus may generate a plurality of driving routes including the driving route 610 by using the route generator, and may identify the final steering avoidance time points for the plurality of driving routes.

The autonomous driving control apparatus may identify a predicted collision time (a time-to-collision (TTC) time) between the host vehicle 601 and the external object (e.g., the external object 505 of FIG. 5).

The autonomous driving control apparatus may calculate a final steering avoidance time point of, among the one or more driving routes generated by using the second route generator, the driving route 610 according to FIG. 6, by using, among the plurality of points corresponding to the external object, the first point 695 (e.g., the second evaluation point 592 of FIG. 5).

The autonomous driving control apparatus may use at least one of a transverse avoidance requiring distance 680, an available transverse acceleration, a minimum steering avoidance time 650. or any combination thereof to calculate the final steering avoidance time point 654 for the driving route 610.

For example, the transverse avoidance requiring distance may be a distance value calculated by adding a first length from the first point 695 corresponding to the external object to a contact point 699 that contacts a transverse line extending from the first point 695 on the driving route 610 and a second length regarding the host vehicle 601. As an example, the second length may be a portion (e.g., a half of a width of a body) of a width of a body of the host vehicle 601.

For example, the available transverse acceleration may be a value obtained by subtracting a transverse acceleration value required for the host vehicle 601 to travel along the driving route 610 in an allowable transverse acceleration limit value of the host vehicle 601. As an example, the allowable transverse acceleration limit value of the host vehicle 601 may be a setting value that may be changed by a user and/or a manufacturer of the host vehicle 601.

The minimum steering avoidance time 654 may be a necessary time that is required for the host vehicle 601 to the first point 695 corresponding to the external object.

The autonomous driving control apparatus may calculate a left minimum steering avoidance time, at which the external object is avoided leftwards with respect to a direction which the host vehicle 601 faces, and a right minimum steering avoidance time, at which the external object is avoided rightwards. For example, the autonomous driving control apparatus may determine a smallest value of the right minimum steering avoidance time and the left steering avoidance requiting time, which have been calculated, as a minimum steering avoidance time that is to be used to calculate the final steering avoidance time point.

For example, the autonomous driving control apparatus may identify a right avoidance route 620, by which the external object is avoided rightwards with respect to the direction which the host vehicle 601 faces, in a process of controlling driving of the host vehicle 610 based on the driving route 610. As an example, the autonomous driving control apparatus may acquire the minimum steering avoidance time 654 required to avoid the external object based on the right avoidance route 620, based on the required travel time to the first point 695 (or the evaluation point).

As an example, an equation for calculating the steering avoidance requiting time 654 may be as follows.

$$\sqrt{2 * \frac{\text{transverse avoidance requiring distance}}{\text{available transverse acceleration}}} + \quad \text{[Equation 1]}$$
$$\text{travel requiring time to evaluation poit}$$

For example, the autonomous driving control apparatus may calculate the final steering avoidance time 650 by subtracting the minimum steering avoidance time 654 calculated through Equation 1 described above from the predicted collision time with the external object.

For example, the final steering avoidance time 650 may be referenced by a travel time from a current location of the host vehicle 601 to a final point 670 for avoiding a collision with the first point 695.

For example, the autonomous driving control apparatus may calculate a plurality of final steering avoidance times by performing an operation of identifying the above-described final steering avoidance time 650 by further using at least some of the plurality of points corresponding to the external object, for the driving route 610. The autonomous driving control apparatus may make a minimum value of the plurality of final steering avoidance times correspond to the final steering avoidance time 650 of the driving route 610 and may store it in the memory.

Figure 7:
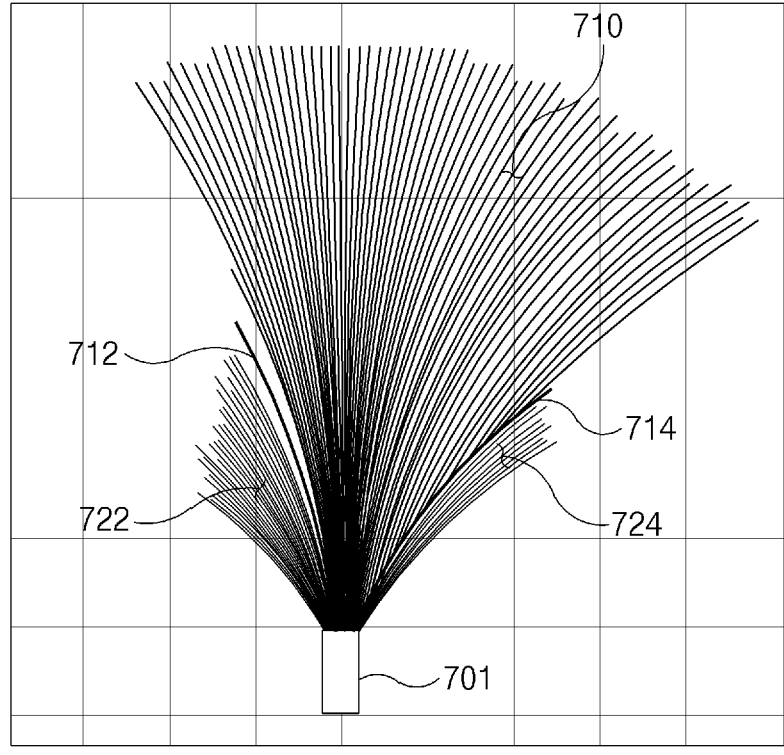
FIG. 7 is a conceptual view illustrating a non-collision route range determined by an autonomous driving control apparatus.

FIG. 7 is a conceptual view illustrating a non-collision route range determined by the autonomous driving control apparatus.

The autonomous driving control apparatus (e.g., the autonomous driving control apparatus 100 of FIG. 1) may identify which range of the non-collision route range 710 or the collision route ranges 722 and 724 the one or more driving routes are included, based on the final steering avoidance time.

For example, the autonomous driving control apparatus may generate the collision route ranges 722 and 724 including, among the one or more driving routes, the first group of driving routes, the final steering avoidance times of which are the specific time or less.

For example, the autonomous driving control apparatus may generate the non-collision route range 710 including, among the one or more driving routes, the second group of driving routes, the final steering avoidance times of which are more than a specific time.

For example, the non-collision route range 710 and the collision route ranges 722 and 724 may be classified by a first border route 712 and a second border route 714. As an example, the collision route ranges 722 and 724 may include a first collision route range 722 and a second collision route range 724. As an example, the first border route 712 and the second border route 714 may be ones of the driving routes, by which the host vehicle 791 avoids a collision with the external object.

For example, the autonomous driving control apparatus may control the host vehicle 791 in, among the first group of driving routes included in the non-collision route range 710, a border route (e.g., the first border route 712 or the second border route 714) when the first driving route, in which the host vehicle 701 travels, is included in the collision route ranges 722 and 724.

For example, the autonomous driving control apparatus may continuously control the host vehicle 701 based on the first driving route when the first driving route, in which the host vehicle 701 travels, is included in the non-collision route range 710.

Figure 8:
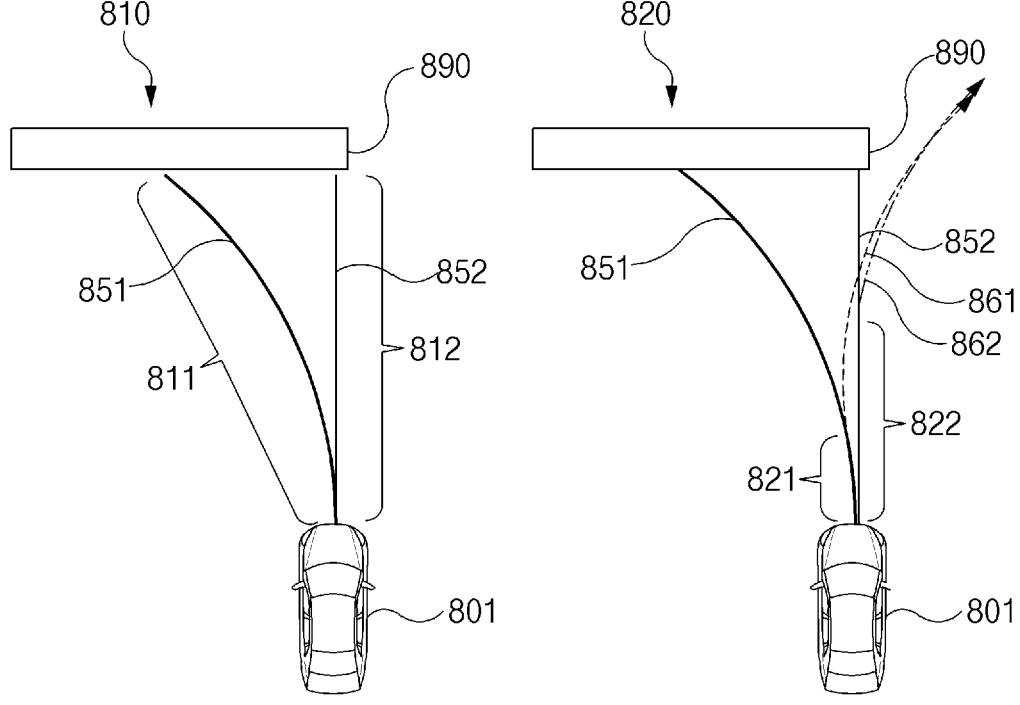
FIG. 8 is a view for comparing results of avoiding a collision based on different collision avoidance schemes by an autonomous driving control apparatus.

FIG. 8 is a view for comparing results of avoiding a collision based on different collision avoidance schemes by the autonomous driving control apparatus.

FIG. 8 is a view illustrating a difference between a method for avoiding a collision with an external object 890 by using time-to-collision (TTC) and a method for avoiding a collision with an external object 890 by using a final steering avoidance time.

Referring to reference numeral 810, the autonomous driving control apparatus may compare collision danger degrees of a first route 851 and a second route 852 based on the TTC.

For example, the autonomous driving control apparatus may identify that a first collision time 811 that is a collision time with an external object 890 when the host vehicle 801 travels based on the first route 851 is larger than a second collision time 812 that is a collision time with the external object 890 when the host vehicle 801 travels based on the second driving route 852. Accordingly, the autonomous driving control apparatus may identify that the first route 851 is a safer driving route.

Referring to reference numeral 820, the autonomous driving control apparatus may compare collision danger degrees of the first route 851 and a second route 852 based on the final steering avoidance time.

For example, the autonomous driving control apparatus may identify a first avoidance route 861, by which the external may be avoided when the host vehicle 801 travels based on the first route 851, and a second avoidance route, by which the external object 890 is avoided when the host vehicle 801 travels based on the second route 852.

For example, the autonomous driving control apparatus may calculate final steering avoidance time of the first avoidance route 861 and the second avoidance route 862. As an example, the autonomous driving control apparatus may calculate a first final steering avoidance time 821 based on the first avoidance route 861, and a second final steering avoidance time 822 based on the second avoidance route 862.

For example, because the final steering avoidance time 821 is smaller than the second final steering avoidance time 822, the autonomous driving control apparatus may identify that the second route 852 is a safer driving route. In other words, the autonomous driving control apparatus may identify that a more time to a steering control start time for avoiding a collision with the external object 890 is secured because the second final steering avoidance time 822 calculated based on the second route 852 is larger than the first final steering avoidance time 821. Accordingly, the autonomous driving control apparatus may identify that the second route 852 is a safer driving route.

FIG. 9 is a flowchart of operations of the autonomous driving control apparatus.

The autonomous driving control apparatus (e.g., the autonomous driving control apparatus 100 of FIG. 1) may perform the operations disclosed in FIG. 9. For example, at least some of the components (e.g., the memory 110 and/or the route generator 120 of FIG. 1) included in the autonomous driving control apparatus may be configured to perform the operations of FIG. 9.

Hereinafter, the operations of S910 to S950 may be sequentially performed, but may not be performed necessarily sequentially. For example, the sequence of the operations may be changed, and at least two of the operations may be performed in parallel. Furthermore, the contents that correspond to or the same as the contents described above in relation to FIG. 9 will be described briefly or omitted.

The autonomous driving control apparatus may generate the one or more driving routes by using the second route generator while the host vehicle travels in the first driving route generated by the first route generator (S910).

For example, the autonomous driving control apparatus may generate one or more driving routes during a specific maximum search time period based on a specific time cycle.

For example, the autonomous driving control apparatus may generate one or more driving routes in a specific curvature radius range with respect to the host vehicle.

The autonomous driving control apparatus may predict travel routes of external objects that are present adjacently to the one or more driving routes (S920).

For example, the autonomous driving control apparatus may predict a travel route of an external object, except for at least one of an object that travels in a direction that becomes farther away from the host vehicle, an object that travels on a rear side of the host vehicle, or any combination thereof.

The autonomous driving control apparatus may calculate the final steering avoidance times for the one or more driving routes (S930).

For example, the autonomous driving control apparatus may set minimum values of the plurality of final steering avoidance times calculated for the one or more driving routes as the final steering avoidance times, and may store it in the memory such that they correspond to the one or more driving routes.

For example, the autonomous driving control apparatus may calculate a first minimum steering avoidance time, based on a transverse avoidance requiring distance calculated by adding a first length from a first point corresponding to the external object to a contact point that contacts a transverse line extending from the first point on the first driving route, and length regarding the host vehicle, an available a second transverse acceleration obtained by subtracting a transverse acceleration value required for the host vehicle to travel along the one or more driving routes from the first driving route from an allowable transverse acceleration limit value of the host vehicle, and a required travel time that is necessary for the host vehicle to travel from a current point to the first point. As an example, the autonomous driving control apparatus may calculate the final steering avoidance time by subtracting the first minimum steering avoidance time from the predicted collision time with the external object.

For example, the autonomous driving control apparatus may be configured to calculate a second minimum steering avoidance time based on the second point corresponding to the external object, and to calculate a final steering avoidance time by subtracting a largest value of the first minimum steering avoidance time and the second minimum steering avoidance time from the predicted collision time with the external object. As an example, the second point may be a point included in any one of a left area or a right area with respect to the direction which the host vehicle faces.

For example, the autonomous driving control apparatus may be configured to calculate a third minimum steering avoidance time based on the third point corresponding to the external object, and to calculate a final steering avoidance time by subtracting a smallest value of the third minimum steering avoidance time and the second minimum steering avoidance predicted collision time with the external object. As an example, the second point and the third point may be points included in different ones of a left area or a right area with respect to the direction which the host vehicle faces.

The autonomous driving control apparatus may generate a non-collision route range including a first group of driving routes, the final steering avoidance times of which are more than a specific time, and a collision route range including a second group of driving routes, the final steering avoidance times of which are the specific time or less (S940).

The autonomous driving control apparatus may identify whether the first driving route is included in the collision route range (S950).

For example, when the first driving route is included in the collision route range (e.g., operation S950—Yes), the autonomous driving control apparatus may perform operation S960.

For example, when the first driving route is included in the collision route range (e.g., operation S950—No), the autonomous driving control apparatus may perform operation S970.

The autonomous driving control apparatus may control the host vehicle based on one of the first group of driving routes (S960).

For example, the controller 130 may control the host vehicle in a border route that is close to the first driving route in the non-collision route range included in the first group of driving routes when the first driving route is included in the collision route range.

The autonomous driving control apparatus may control the host vehicle based on the first driving route (S970).

For example, the autonomous driving control apparatus may identify that a collision with the external object will not occur when the host vehicle travels in the first driving route, and may continuously control the host vehicle based on the first driving route.

Figure 10:
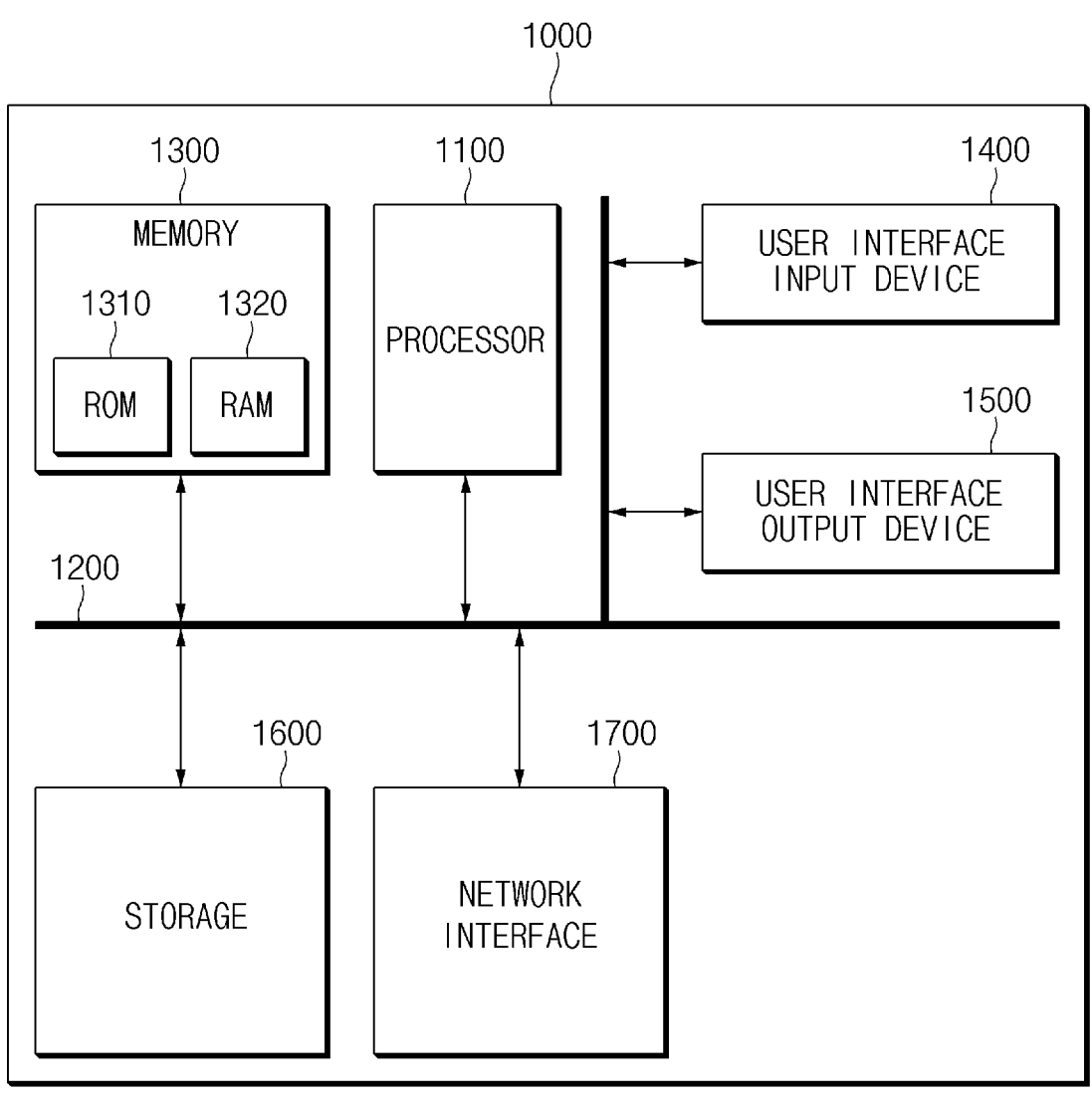
FIG. 10 illustrates a computing system related to an autonomous driving control method.

FIG. 10 illustrates a computing system related to an autonomous driving control method.

Referring to FIG. 10, the computing system 1000 related to the autonomous driving control method may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the one or more example embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The effects of the autonomous driving control apparatus and the autonomous driving control method according to the present disclosure will be described as follows.

According to one or more example embodiments of the present disclosure, a more suitable collision avoidance route of a host vehicle may be generated by using a plurality of driving route generating devices as compared with a collision danger evaluation scheme based on time-to-time (TTC).

Furthermore, according one or to more example embodiments of the present disclosure, a safe autonomous driving control function may be provided to a user through a transverse avoidance even when a range of collision is small (e.g., small overlapping) or the host vehicle travels at a high speed.

Furthermore, according to one or more example embodiments of the present disclosure, a high utility may be provided to a user who is on board in an autonomous driving vehicle by determining a range of a non-collision route and providing information on the determined range area and/or driving of the host vehicle to the user in real time.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the example embodiments disclosed in the present disclosure is not provided to limit the technical spirits of the present disclosure but provided to describe the present disclosure, and the scope of the technical spirits of the present disclosure is not limited by the example embodiments. Accordingly, the technical scope of the present disclosure should be construed by the attached claims, and all the technical spirits within the equivalent ranges fall within the scope of the present disclosure.

What is claimed is:

1. An autonomous driving control apparatus comprising:
   a memory configured to store one or more instructions; and
   a controller coupled to the memory,
   wherein the autonomous driving control apparatus is configured to, when the one or more instructions are executed by the controller:
      generate one or more driving routes while a host vehicle travels in a first driving route;
      generate, based on a comparison of each of a plurality of final steering avoidance times for the one or more driving routes to a threshold time, a non-collision route range and a collision route range among the one or more driving routes; and
      control, based on the first driving route being included in the collision route range, the host vehicle to travel in a second driving route included in the non-collision route range,
      wherein each of the final steering avoidance times is based on a time duration for the host vehicle to reach a point where the host vehicle starts steering to avoid a collision according to a corresponding one of the one or more driving routes.

2. The autonomous driving control apparatus of claim 1, wherein the autonomous driving control apparatus is configured to, when the one or more instructions are executed by the controller:
   control, based on the first driving route being included in the non-collision route range, the host vehicle to maintain course in the first driving route.

3. The autonomous driving control apparatus of claim 1, wherein the autonomous driving control apparatus is configured to, when the one or more instructions are executed by the controller:
   generate the one or more driving routes by generating the one or more driving routes during a specific maximum search time period based on a specific time cycle.

4. The autonomous driving control apparatus of claim 1, wherein the one or more driving routes are within a specific curvature radius range associated with the host vehicle.

5. The autonomous driving control apparatus of claim 1, wherein the autonomous driving control apparatus is configured to, when the one or more instructions are executed by the controller:
   predict a travel route of an external object, wherein the external object does not move away from the host vehicle, and wherein the external object does not move behind the host vehicle.

6. The autonomous driving control apparatus of claim 1, wherein the autonomous driving control apparatus is configured to, when the one or more instructions are executed by the controller:

determine a largest value of the plurality of final steering avoidance times; and store, in the memory, the largest value in correspondence to the one or more driving routes.

7. The autonomous driving control apparatus of claim 1, wherein the autonomous driving control apparatus is configured to, when the one or more instructions are executed by the controller, determine a first minimum steering avoidance time, based on at least one of:

a transverse avoidance requiring distance calculated by adding a first length from a first point corresponding to an external object to a contact point that contacts a transverse line extending from the first point on the one or more driving routes, and a second length regarding the host vehicle, an available transverse acceleration obtained by subtracting a transverse acceleration value required for the host vehicle to travel along the one or more driving routes from the first driving route from an allowable transverse acceleration limit value of the host vehicle, or a required travel time that is necessary for the host vehicle to travel from a current point to the first point, and wherein the autonomous driving control apparatus is configured to determine the plurality of final steering avoidance times for the one or more driving routes by subtracting the first minimum steering avoidance time from a predicted collision time with the external object.

8. The autonomous driving control apparatus of claim 7, wherein the autonomous driving control apparatus is configured to determine the plurality of final steering avoidance times by:

determining a second minimum steering avoidance time based on a second point corresponding to the external object; and subtracting a larger value of the first minimum steering avoidance time and the second minimum steering avoidance time from the predicted collision time with the external object, and wherein the second point is a point included in one of a left area or a right area with respect to a direction which the host vehicle faces.

9. The autonomous driving control apparatus of claim 8, wherein the autonomous driving control apparatus is configured to determine the plurality of final steering avoidance times by:

determining a third minimum steering avoidance time based on a third point corresponding to the external object; and subtracting a smaller value of the first minimum steering avoidance time and the third minimum steering avoidance time from the predicted collision time with the external object, and wherein the first point and the third point are included in different areas of the left area and the right area.

10. The autonomous driving control apparatus of claim 1, wherein the autonomous driving control apparatus is configured to, when the one or more instructions are executed by the controller:

control, based on the first driving route being included in the collision route range, the host vehicle to travel in a border route that is closest, of the non-collision route range, to the first driving route.

11. A method comprising:

generating, by one or more processors, one or more driving routes while a host vehicle travels in a first driving route;

generating, based on a comparison of each of a plurality of final steering avoidance times for the one or more driving routes to a threshold time, a non-collision route range and a collision route range among the one or more driving routes; and control, based on the first driving route being included in the collision route range, the host vehicle to travel in a second driving route included in the non-collision route range, wherein each of the final steering avoidance times is based on a time duration for the host vehicle to reach a point where the host vehicle starts steering to avoid a collision according to a corresponding one of the one or more driving routes.

12. The method of claim 11, further comprising:

generating one or more additional driving routes while the host vehicle travels in a third driving route; and controlling, based on the third driving route being included in a second non-collision route range, the host vehicle to maintain course in the third driving route.

13. The method of claim 11, wherein the generating of the one or more driving routes comprises:

generating the one or more driving routes during a specific maximum search time period based on a specific time cycle.

14. The method of claim 11, wherein the one or more driving routes are in a specific curvature radius range associated with the host vehicle.

15. The method of claim 11, further comprising:

predicting a travel route of an external object, wherein the external object does not move away from the host vehicle, and wherein the external object does not move behind the host vehicle.

16. The method of claim 11, further comprising:

determining a largest value of the plurality of final steering avoidance times; and storing the largest value in correspondence to the one or more driving routes.

17. The method of claim 11, further comprising:

determining a first minimum steering avoidance time, based on at least one of:

a transverse avoidance requiring distance calculated by adding a first length from a first point corresponding to an external object to a contact point that contacts a transverse line extending from the first point on the one or more driving routes, and a second length regarding the host vehicle, an available transverse acceleration obtained by subtracting a transverse acceleration value required for the host vehicle to travel along the one or more driving routes from the first driving route from an allowable transverse acceleration limit value of the host vehicle, and a required travel time that is necessary for the host vehicle to travel from a current point to the first point; and determining the plurality of final steering avoidance times for the one or more driving routes by subtracting the first minimum steering avoidance time from a predicted collision time with the external object.

18. The method of claim 17, wherein the determining the plurality of final steering avoidance times comprises:

determining a second minimum steering avoidance time based on a second point corresponding to the external object; and subtracting a larger value of the first minimum steering avoidance time and the second minimum steering avoidance time from the predicted collision time with the external object, and wherein the first point and the second point are included in a same area of a left area or a right area with respect to a direction which the host vehicle faces.

19. The method of claim 18, wherein the determining the plurality of final steering avoidance times comprises:

determining a third minimum steering avoidance time based on a third point corresponding to the external object; and subtracting a smaller value of the first minimum steering avoidance time and the third minimum steering avoidance time from the predicted collision time with the external object, and wherein the first point and the third point are included in different areas of the left area and the right area with respect to the direction which the host vehicle faces.

20. The method of claim 11, further comprising:

controlling, based on the first driving route being included in the collision route range, the host vehicle to travel in a border route that is closest, of the non-collision route range, to the first driving route.

* * * * *